United States Patent
Righetti

(10) Patent No.: US 8,250,971 B2
(45) Date of Patent: Aug. 28, 2012

(54) DEVICE FOR PRODUCING COFFEE

(75) Inventor: Marco Righetti, Bologna (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 1079 days.

(21) Appl. No.: 12/094,319

(22) PCT Filed: Nov. 22, 2005

(86) PCT No.: PCT/IT2005/000681
§ 371 (c)(1),
(2), (4) Date: Jul. 14, 2008

(87) PCT Pub. No.: WO2007/060694
PCT Pub. Date: May 31, 2007

(65) Prior Publication Data
US 2008/0276807 A1    Nov. 13, 2008

(51) Int. Cl.
*A47J 31/40* (2006.01)
(52) U.S. Cl. .......................... 99/302 P; 99/297
(58) Field of Classification Search .............. 99/302 P, 99/302 R, 297, 298 R
See application file for complete search history.

(56) References Cited

U.S. PATENT DOCUMENTS

| | | | | |
|---|---|---|---|---|
| 4,470,999 A * | 9/1984 | Carpiac | ............. | 426/506 |
| 5,186,096 A * | 2/1993 | Willi | ............. | 99/282 |
| 5,975,365 A * | 11/1999 | Hsieh | ............. | 222/129.4 |
| 6,199,472 B1 * | 3/2001 | Greiwe | ............. | 99/291 |
| 7,685,930 B2 * | 3/2010 | Mandralis et al. | ............. | 99/295 |
| 7,980,170 B2 * | 7/2011 | Paloheimo | ............. | 99/290 |
| 2003/0116026 A1 * | 6/2003 | Koning et al. | ............. | 99/279 |
| 2003/0147997 A1 * | 8/2003 | De Koning et al. | ............. | 426/77 |
| 2008/0276807 A1 * | 11/2008 | Righetti | ............. | 99/289 R |

FOREIGN PATENT DOCUMENTS

| | | |
|---|---|---|
| DE | 33 16 157 A1 | 11/1984 |
| EP | 1 133 944 B1 | 9/2001 |
| EP | 1 267 685 B1 | 1/2003 |
| EP | 1 308 115 A1 | 5/2003 |
| WO | WO 01/74212 A1 | 10/2001 |

* cited by examiner

Primary Examiner — Raleigh W. Chiu

(57) ABSTRACT

A device with an infusion chamber defined by at least two parts movable in relation to each other to close and open the infusion chamber; a duct to supply pressurized hot water to the infusion chamber; at least one pump to supply pressurized hot water to the infusion chamber; and a dispensing unit to dispense coffee from the infusion chamber. The dispensing unit has at least a first configuration and a second configuration, according to the type of coffee to be dispensed; the two parts defining the infusion chamber have at least a first reciprocal position to define a larger infusion volume and a second reciprocal position to define a smaller infusion volume and the dispensing unit is switched to one or other of said at least two configurations when said at least two parts are in the second reciprocal position.

32 Claims, 15 Drawing Sheets

DEVICE FOR PRODUCING COFFEE

CROSS REFERENCE TO RELATED APPLICATIONS

This application is a U.S. National Phase application of International Application PCT/IT2005/000681, the entire contents of which are incorporated herein by reference.

FIELD OF THE INVENTION

The present invention pertains to improvements to devices or machines for producing coffee, both for domestic use and for professional and commercial use, for example in vending machines.

BACKGROUND OF THE INVENTION

Machines are currently available for producing espresso coffee which comprise an infusion chamber, inside which a charge of ground coffee or a single-serving sachet; in the form of a capsule, cartridge, pod or the like, containing coffee powder, is placed, and through which pressurized water is subsequently made to flow at a sufficiently high temperature to extract the flavors of the coffee powder, with which the beverage is prepared.

The characteristics of the beverage that can be obtained with these machines can vary also on the basis of the settings provided by the user. For example, these machines can produce espresso coffee at high pressure, forming the typical froth that distinguishes this beverage, or a longer coffee, such as filter or so-called fresh brew coffee, which is produced utilizing lower pressures and larger quantities of water.

Solutions suitable to select the quality of coffee obtained are currently utilized both in machines for private or domestic use and in machines for commercial or professional use, or in vending machines in which dispensing of coffee is subordinate to payment (using coins or prepaid cards) of the cost of the beverage.

EP-A-1.133.944 describes a machine for producing coffee, in which the infusion chamber is provided with a dispensing device designed to be able to produce, as chosen by the user, different qualities or types of coffee, for example more or less concentrated. More specifically, the publication EP-A-1.133.944 describes a device for producing coffee which comprises a supply line for hot water delivered from a pump, a coffee dispensing device, an infusion chamber into which the hot water supply line flows and out of which the coffee dispensing duct, which is part of the dispensing device, flows. The infusion chamber is delimited by reciprocally movable parts; one of which is in the form of a piston, which slides with respect to a cylinder. To allow different qualities of coffee to be dispensed, a valve is positioned on the dispensing device and provided with a plug element associated with a preload spring and means to allow modification of the cross section of the coffee outflow duct, to provide a first passage with a smaller cross section operating at a higher pressure and with a lower flow rate, and a second passage with a larger cross section to operate with a higher flow rate and lower pressure.

In particular, one of the embodiments described in EP-A-1.133.944 is provided with a valve to regulate the flow rate and a throttling device, controllable manually or also by means of an actuator, set by the user of the machine, to increase or decrease the cross section of the passage for the coffee. By modifying the section of the passage, a higher or lower pressure can be generated inside the infusion chamber, thereby also modifying the flow of coffee dispensed and the water delivered to the infusion chamber, obtaining different qualities of coffee, which can be selected by the user.

For similar functions and objectives, the subsequent publication EP-A-1.267.685 describes a machine for producing coffee, in which the cross section of the passage for the coffee is modified to switch from a larger cross section to a smaller cross section or vice versa, acting on operation of the pump delivering the pressurized water. More specifically, in EP-A-1.267.685 a coffee dispensing valve is provided, designed to react automatically to the delivery pressure of the water, so that a higher delivery pressure causes throttling of the valve and therefore slower outflow of the coffee. By making the pump deliver the water at a lower pressure, and therefore, for example, making the pump run at a power below the rated power, the delivery pressure of the water in the infusion chamber is below the value which causes automatic throttling of the coffee outlet valve. The flow rate of the water and hence of the coffee dispensed is higher than in the previous case and the production pressure is lower, to obtain a weaker coffee than the coffee obtained with delivery of water at high pressure.

Therefore, the machine described in EP-A-1.267.685 requires control of the pump in order to operate. Operating the pump at different pressures can cause modification of the structure of the beverage dispensing valve and coffees of different qualities can thus be obtained.

SUMMARY OF THE INVENTION

The object of the present invention is to produce a device or machine for producing coffee which, in a simple and reliable way, allows coffee of different types or qualities to be produced. According to a particular embodiment, the object of the present invention is to produce a machine which, in a simple, reliable and easily controllable way, can produce coffee at high pressure, typically espresso coffee, and filter coffee at low pressure, i.e. so-called fresh brew coffee.

In substance, according to a first aspect, the invention relates to a device or a machine for producing coffee, comprising an infusion chamber defined by at least two parts movable in relation to each other to close and open the infusion chamber; a duct to supply pressurized hot water to the infusion chamber; at least one pump to supply pressurized hot water to the infusion chamber; a dispensing unit to dispense coffee from the infusion chamber towards a dispensing nozzle or the like. Characteristically, according to the invention: the dispensing unit has at least a first configuration and a second configuration, according to the type of coffee to be dispensed; the two parts defining the infusion chamber have at least a first reciprocal position to define a larger infusion volume and a second reciprocal position to define a smaller infusion volume; the two parts defining the infusion chamber are functionally connected to the dispensing unit, so that the dispensing unit is switched to one or other of the at least two configurations according to the reciprocal position taken by the parts defining the infusion chamber.

In this way a device is obtained which, with an extremely simple and reliable structure, can dispense coffee with characteristics that vary even greatly, for example from a thick espresso with froth to a long coffee, known as American, fresh brew or filter coffee. The device also allows the use of pods or capsules of different dimensions in a single dispenser, thanks to the possibility of obtaining closing positions in different positions of the infusion chamber, with consequent different switching of the dispensing unit.

In principle, switching of the dispensing unit can, for example, be obtained with an electric control, operated directly by one or other of the two reciprocally movable parts forming the infusion chamber. The electric control can, for example, act on a valve to partially restrict the flow through the dispensing unit. This partial restriction can be obtained by fully closing one or more of a plurality of passages, or by throttling one or more passages. For example, a movable part of the infusion chamber can act on one or more switches which control switching of the dispensing unit.

However, in order to obtain a simpler and more reliable device, of easier construction and management, in a particularly advantageous embodiment of the invention at least one of the two parts defining the infusion chamber is arranged and designed to act mechanically on the dispensing unit to cause switching according to the reciprocal position taken by the two parts defining the infusion chamber. In this way, with a single suitably controlled actuator, closing of the infusion chamber in one or other of two or more alternative closing positions can be controlled, defining different infusion volumes and at each of the positions the dispensing unit is switched to the correct operating condition, without the need for further controls, mechanisms or circuits and, if so desired, without the need to act on the hot water delivery pump or pumps. This makes the device extremely simple, sturdy, reliable and inexpensive.

For example and typically, one of the parts defining the infusion chamber can be fixed with respect to a load bearing structure and the other can be movable, and designed and arranged to act mechanically on the dispensing unit and cause switching according to the position with respect to the fixed part. The dispensing unit can advantageously be integral with the first of the two parts defining the infusion chamber, i.e. to the fixed part with respect to the structure of the machine or device.

In a preferred embodiment of the invention, the dispensing unit has a first passage with a larger cross section to dispense coffee at a first lower pressure (fresh brew), and a second passage with a smaller cross section to dispense coffee at a second higher pressure (espresso). Moreover, a closing member can advantageously be associated with the first passage, arranged and controlled to be taken to the closed position of the first passage when the two parts defining the infusion chamber are taken to the second reciprocal position. In this way only the second passage with smaller cross section, suitable to cause infusion of the coffee at high pressure, for example to produce espresso coffee, remains open. In a device thus configured the closing member, to close the first passage, is controlled mechanically directly by one of the parts defining the infusion chamber.

When the dispensing unit is fixed with respect to a first of the aforesaid at least two parts defining the infusion chamber, the second of the two parts, movable with respect to the first, can have an edge that acts on the dispensing unit, for example directly on the closing member. This makes it possible to avoid any type of transmission or mechanical connection, while not excluding the possibility that switching is performed mechanically according to the reciprocal position of the two parts defining the infusion chamber, but with interposition, for example, of a transmission member of a control movement, rather than directly. This can, for example, take place when the dispensing unit is not in one piece with the fixed part of the infusion chamber or is not applied in close proximity to the movable part, which controls switching thereof.

The second passage of the dispensing unit can advantageously be provided with a back pressure valve. Back pressure valve is intended as a member which allows a pressure higher to the pressure which would be obtained if this valve were not present, to be maintained at the inlet of the passage or inside the infusion chamber. In this way the pressure at which the flavors are extracted from the coffee powders can be increased even considerably. Typically, this pressure can be between 5 and 15 bar, values which must, however, be deemed indicative and non-limiting. At high pressures, closer to the upper limit, stronger beverages with the typical froth characteristic of espresso coffee are obtained.

To give the device greater flexibility of use, according to a possible embodiment the back pressure valve can be regulated, to increase or decrease the extraction pressure. This forms a further variable parameter in setting the infusion conditions and therefore in the quality of the beverage that can be obtained.

In addition or in alternative to a simple back pressure valve, a valve to regulate the flow rate can be associated with the second passage of the dispensing unit, as will be described with reference to a specific embodiment of the invention. This valve can in turn be regulated by the user, to obtain a further degree of freedom in setting the infusion conditions. Regulation can take place directly, for example by acting on a screw device, or, and preferably, by means of an electromechanical or hydraulic actuator, which responds to a command transmitted by a control unit.

In fact, the device can conveniently be provided with a control unit which manages the various regulations and adjustments, so that the type and characteristics of the beverage can be set by the user by means of a simple and intuitive interface, a programmable unit being provided to set regulation of the various machine parts.

Preferably and advantageously the pump or pumps of the device are vibration pumps, with an actuator comprising an electromagnet, a piston and an electrical power supply obtained by chopping through a diode of an alternating current, with sinusoidal waveform. It would also be possible to use other types of pumps. There may also be two or more pumps, identical to or differing from one another, for example as regards power, delivery pressure, flow rate, etc. These pumps can be activated alternatively to or in various combinations with one another according to the dispensing and infusion conditions.

In a preferred embodiment, however, a pump (or a group of pumps) is provided, controlled always to supply the maximum pressure compatible with the characteristics of the hydraulic circuit connected to the delivery side of the pump, in any closed or open conditions of the first and second passage of the dispensing device. In this case, therefore, the pump is designed and controlled to operate always on the same characteristic curve, irrespective of the switching conditions of the dispensing unit.

If the pump is controlled to operate in different operating conditions according to the desired characteristics of the coffee, it can be choked by supplying it with power intermittently and/or with a chopped voltage. Choking or controlled modification of the delivery conditions of the pump is particularly advantageous when the dispensing unit is switched to dispense filter or so-called fresh brew coffee.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
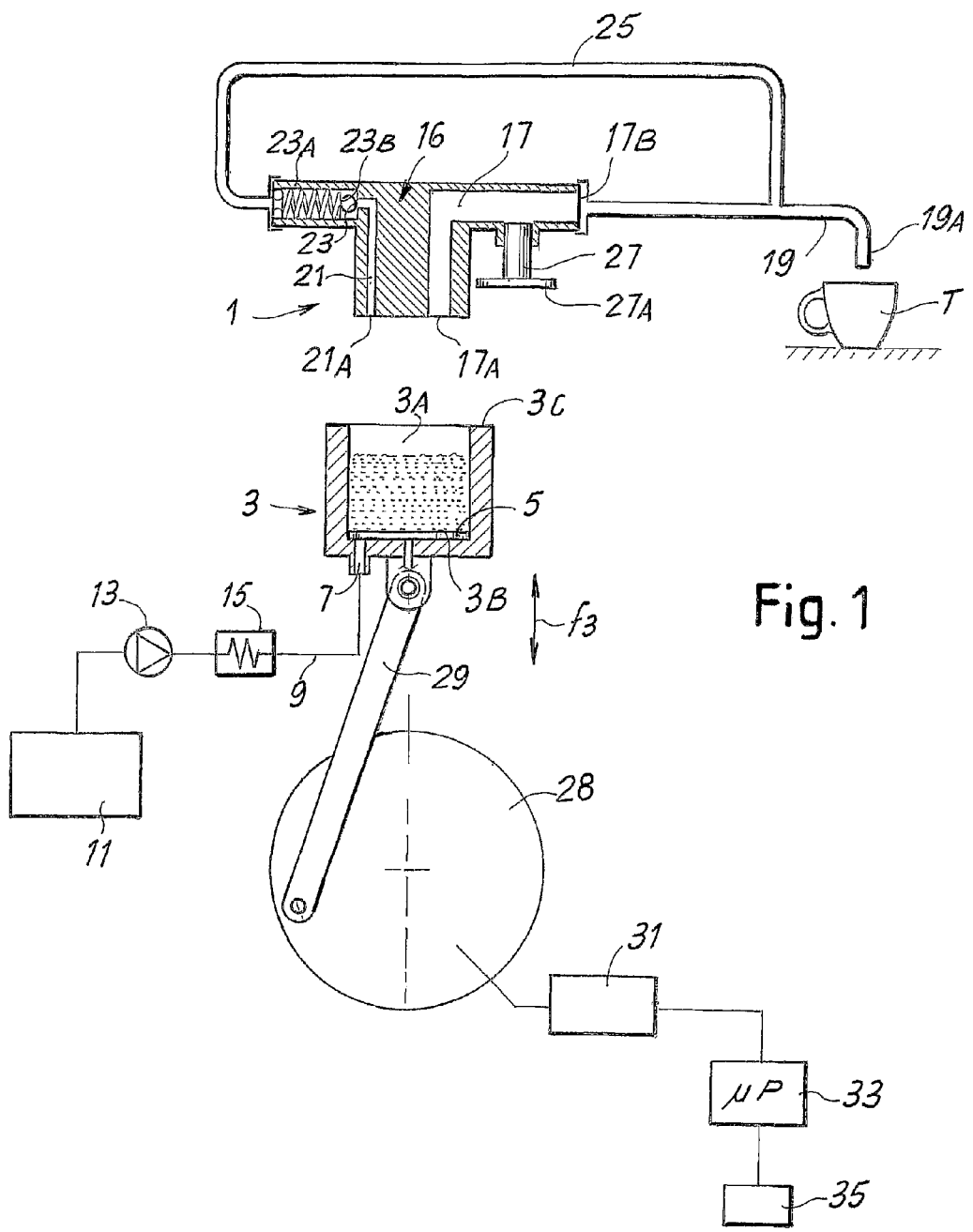
FIGS. 1 to 5 are schematic longitudinal section views of a device according to the invention in a first embodiment and in various operating phases.

Referring to the drawings in particular, FIGS. 1 to 5 show the principle on which the invention is based with reference to a schematic configuration. The figures show exclusively the elements of a machine or device for producing coffee required in order to understand the present invention, while elements which are part of the machine, but are known per se and not necessary to understand the invention, have been omitted.

More specifically, the figures show the infusion chamber with the components of which it is composed and, schematically, the opening and closing mechanisms of the infusion chamber and of supply of pressurized water.

Two parts or portions movable with respect to each other, generically indicated with 1 and 3, define an infusion chamber inside which the coffee powder to produce the beverage is placed. Hereunder reference will be made to a system to prepare the beverage by means of coffee powder loaded directly into the infusion chamber, and compressed therein to form a charge or tablet of coffee powder. However, it would also be possible to use single serving sachets of coffee powder, such as perforable capsules or cartridges, pods or the like, which are inserted individually into the infusion chamber. In this case the chamber can be provided, if necessary, with suitable perforators to perforate the walls of the cartridge or capsule and allow inflow of pressurized water and extraction of the beverage from the single serving sachet.

In the schematic example shown, the lower portion or part 3 is movable and takes the structure of a cylinder with a cavity 3A which defines the inner volume of the infusion chamber, the base of which is indicated with 3B, positioned adjacent to which is an ejector 5 provided with a filter. As explained hereunder, the purpose of the ejector 5 is to eject the exhausted coffee powder after the beverage has been dispensed. A hole 7 is provided to deliver pressurized hot water, coming from a water line 9, to the infusion chamber. The water is drawn from a reservoir indicated schematically with 11 by means of a pump 13, positioned downstream of which is a heating element, for example an electrically powered instant boiler, indicated schematically with 15, which heats the water pressurized by the pump 13 to the desired temperature.

The part or portion 1 is fixed and a coffee dispensing device or unit is produced in one piece therewith, which, in this example, includes a first passage or duct 17 with a larger cross section, with an inlet 17A, facing the inner volume 3A of the infusion chamber, and an outlet 17B which connects to a beverage dispensing line, indicated schematically with 19 and terminating in a per se known way with a spout 19A from which the coffee is delivered to be collected in a cup T or other container specifically positioned under the spout 19A.

The dispensing unit, indicated with 16, also includes a second passage 21 with a substantially smaller cross section than the passage 17 and having an inlet 21A, also facing the inner volume 3A of the infusion chamber and provided, at the end opposite with respect to the inlet 21A, with a throttle valve, or throttle 23. Downstream of the throttle valve 23 the outlet of the second passage 21 is connected to the coffee dispensing line 19 by means of a line 25.

Associated with the first passage or duct 17 with larger cross section is a closing member 27, represented schematically by a slider which moves crosswise with respect to the axis of the duct or passage 17 and provided with an actuation disc 27A, which cooperates, as will be explained hereunder, with an annular edge 3C of the movable part 3 forming—together with the fixed part 1—the infusion chamber.

The movable part 3 is provided with a movement according to the arrow f3 imparted by a kinematic mechanism schematically represented by a connecting rod-crank system composed of an eccentric 28 and a connecting rod 29. A kinematic mechanism, not shown, operates the ejector 5. In practice, the movements of both the ejector 5 and of the part 3 of the infusion chamber can be imparted with a kinematic mechanism, per se known and utilized, for example, on machines produced by Saeco International Group S.p.A. known by the trade names Idea®, SG500®, FS400®, Royal®, SG200®, Magic®, Incanto®, Vienna® and others. This kinematic mechanism is also described in EP-A-0 154 206, which may be referred to for greater details.

FIG. 1 also schematically indicates a motor 31, which controls rotation of the eccentric 28. The control unit, indicated schematically with 33 is, for example a microprocessor, suitably interfaced with the user with an interface indicated schematically with 35 and connected to a motor 31 to control movements of the eccentric 28.

Figure 2:
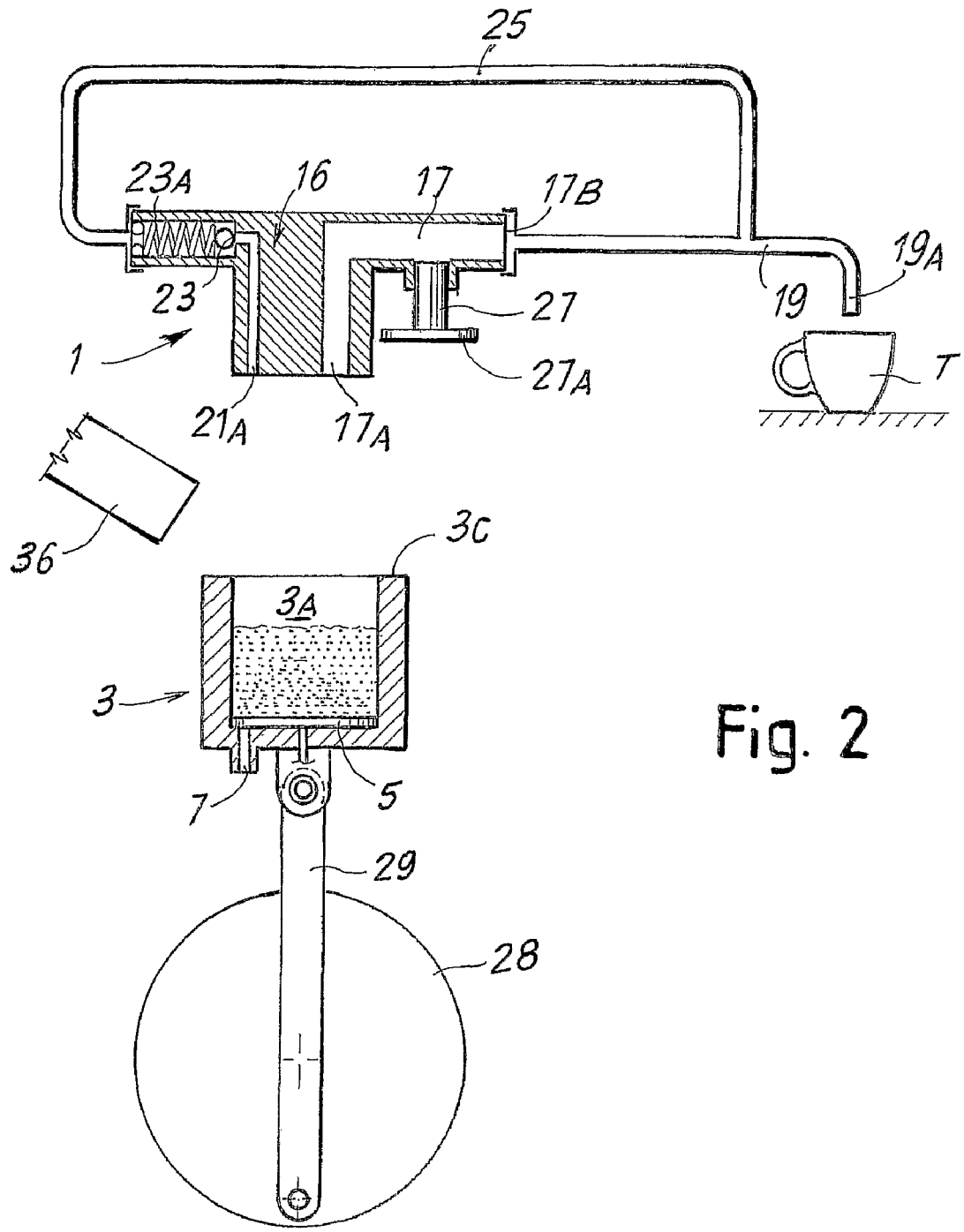

The operating cycle of the device described hereinbefore with reference to FIG. 1 is schematically represented in the sequence in FIGS. 2, 3 and 5 or 2, 4 and 5, in two different utilization modes. In FIG. 2 the movable part 3 is in the lower position thereof, corresponding to the bottom dead center of the eccentric 28 and connecting rod 29 kinematic mechanism. In this position, by means of a loading device 36, indicated schematically in FIG. 2 and per se known, the coffee powder is loaded into the compartment 3A inside the movable part 3.

Figure 3:
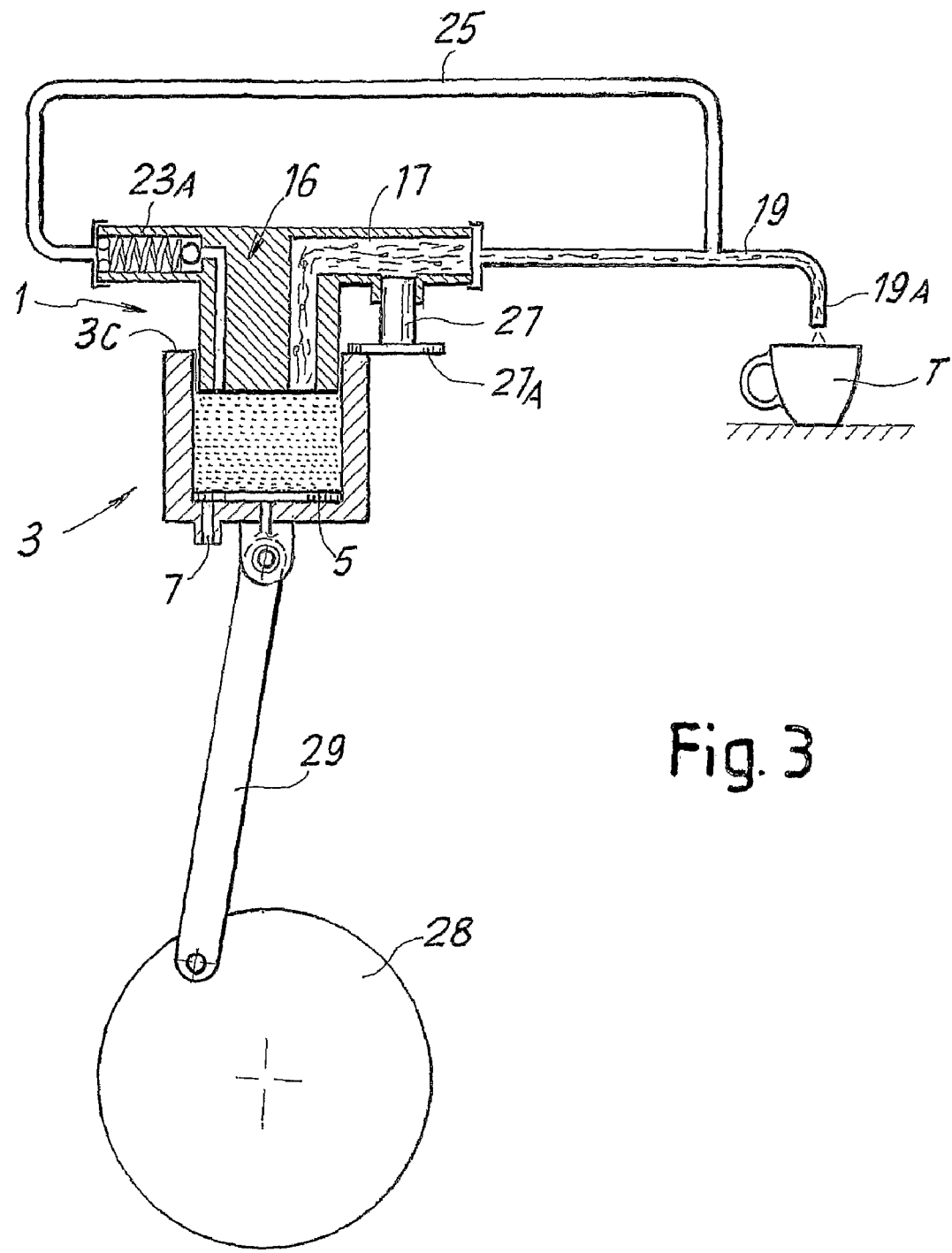

FIG. 3 shows the closing position of the infusion chamber, position which is reached by taking the movable part 3 with the edge thereof 3C to a greater height with respect to the lower side of the fixed part 1. FIG. 3 represents one of the at least two possible alternative operating positions that may be taken by the device. In this position the edge 3C of the movable part 3 is in proximity or in contact with the lower disc 27A of the closing member 27, although without taking the latter to the closed position. The inner volume of the infusion chamber defined by coupling of the parts 4 and 3 is relatively large and the coffee powder contained inside this chamber has been compressed relatively little. The degree of compression of the coffee powder depends on the quantity of coffee placed in the volume 3A and on the final position taken by the movable part 3.

At this point the pump 13 is operated to dispense the coffee. This can advantageously be designed and controlled to operate always on a single characteristic curve, corresponding to maximum power. As the closing member 27 has not closed the passage 17 with the larger cross section and as the coffee powder in the infusion chamber is only moderately compressed, the head loss along the path of the water and of the beverage produced by the device is reduced and consequently the pump 13 delivers a high flow rate of water at low pressure, for example typically 3 bar, the value being considered indicative and not binding. At this pressure the throttle 23 can be completely closed so that the coffee flowing from the infusion chamber passes exclusively through the first passage or duct 17 with larger cross section. It would also be possible for the throttle 23 to open slightly, in which case part of the coffee dispensed will pass through the passage 21 and the line 25 and will be reunited in the line 19 with the main flow of coffee dispensed through the passage 17.

Coffee thus produced will have the characteristics of fresh brew or filter coffee.

The same device can, however, be taken to an operating condition to produce espresso coffee or in any case a stronger and denser coffee, by operating at a higher pressure and with a lower flow rate of water delivered from the pump 13. In this case the parts of the device described hereinbefore will have the configuration shown in FIG. 4, in which the coffee powder inserted in the infusion chamber is compressed to a greater extent, following increased upward travel of the movable part 3 and consequent reduction of the volume 3A of the infusion chamber. Compacting of the coffee powder can be greater, with respect to the configuration in FIG. 3, also due to a possible greater quantity of powder placed in the volume 3A of the infusion chamber.

The increased upward travel of the movable portion or part 3 also causes consequent closing, through the closing member 27, of the passage 17 with larger section.

As a consequence of this, along the path of the liquid from the pump to the dispensing spout 19A there will be a drop in pressure substantially higher than that obtained in the configuration in FIG. 3. This is both because the coffee powder in the infusion chamber has been compressed to a greater extent, and above all because the passage 17 has been closed and consequently the coffee produced in the infusion chamber must pass through the narrower passage or duct 21. This passage is closed by the throttle 23, which causes the increase in pressure at the outlet of the pump until sufficient pressure is reached in the duct 21 to open the throttle or throttle valve 23. This pressure can either be set in the factory or during installation, acting on an elastic member 23A which acts on a closing element 23B (e.g. a needle or ball). It would also be possible for the limit pressure at which the throttle 23 opens to be adjustable by the user, for example by means of an adjusting member which modifies the degree of preload of the spring or other elastic element 23A.

In any case, the pump 13 will in this case deliver (with the passage 17 closed) a lower flow rate at a higher pressure than in the configuration in FIG. 3. If the pump is designed and controlled to operate always at maximum power, in practice it will have an operating point on the same characteristic curve as the operating point in the configuration in FIG. 3. While in the case in FIG. 3 water delivered from the pump could have a pressure of around 3 bar, in the case in FIG. 4 the delivery pressure of the coffee from the infusion chamber can, for example, be regulated at 7 bar or even higher values, for example typically up to 15 bar, by means of adequate calibration of the throttle 23 and of the compression spring 23A thereof. However, these pressure values must be considered indicative and non-limiting and can vary, for example, according to the type of machine (for domestic use, for professional use, vending machine or the like).

Figure 4:
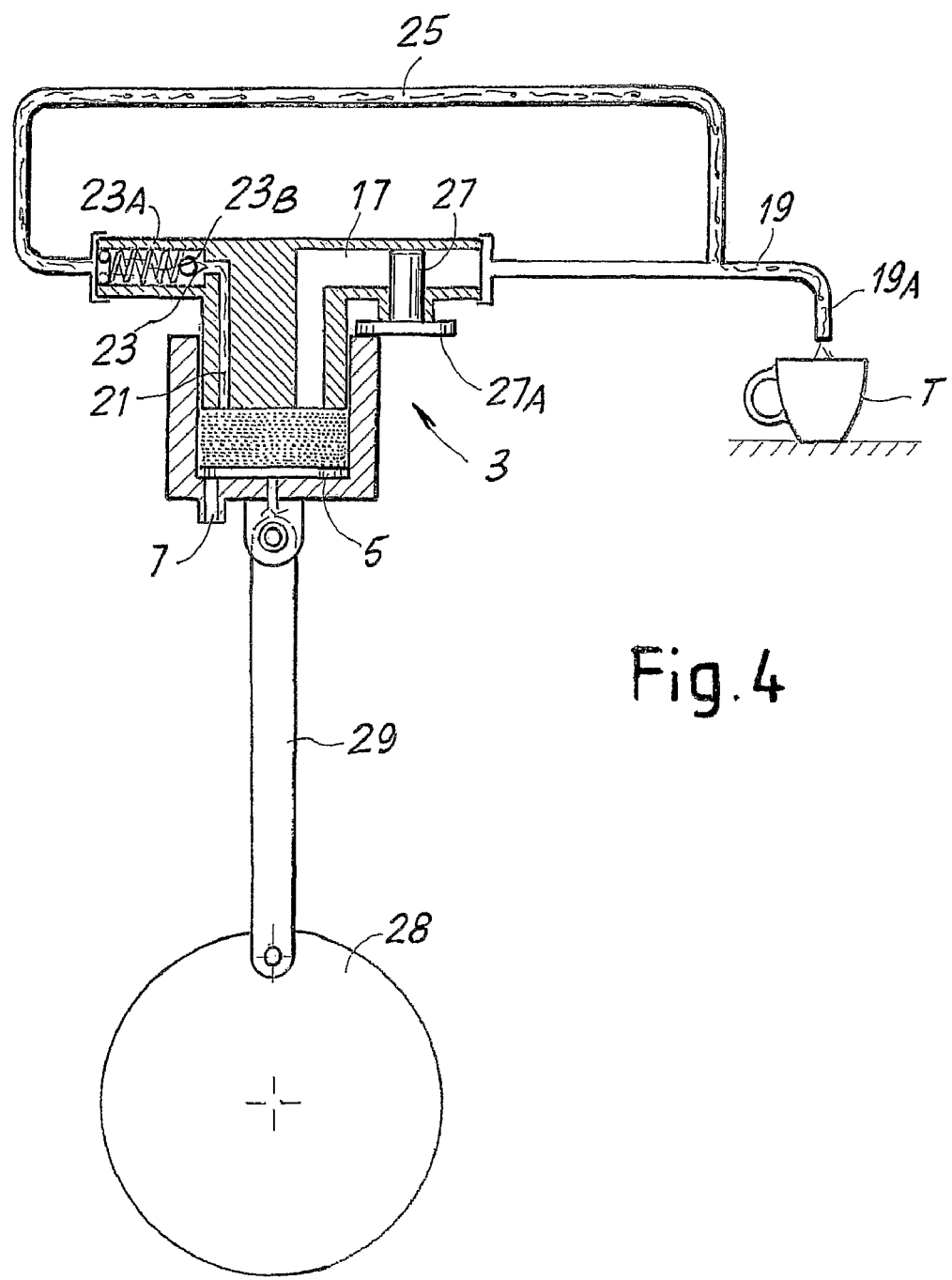
Figure 6:
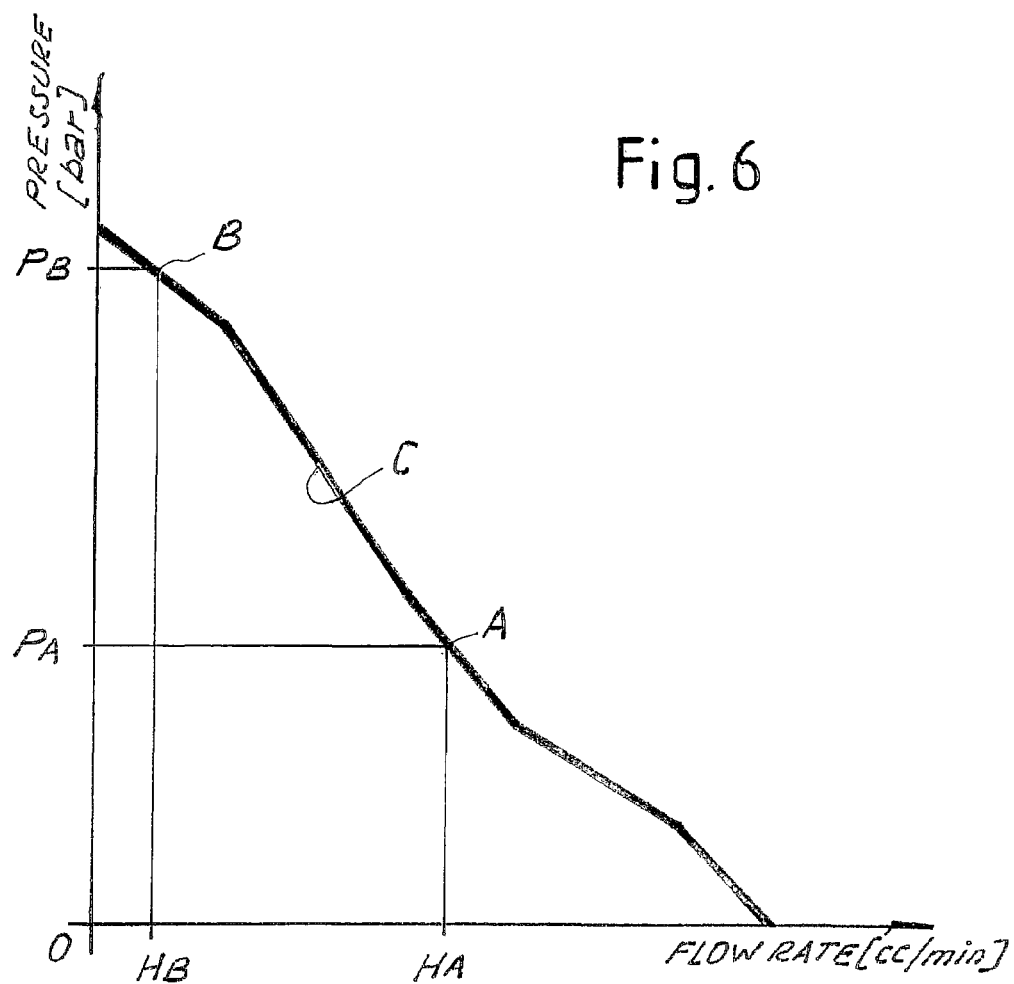
FIG. 6 is a diagram of the characteristic pressure-flow rate curve of the pump, for example a vibration pump, utilizable in the device according to the invention.
Figure 7:
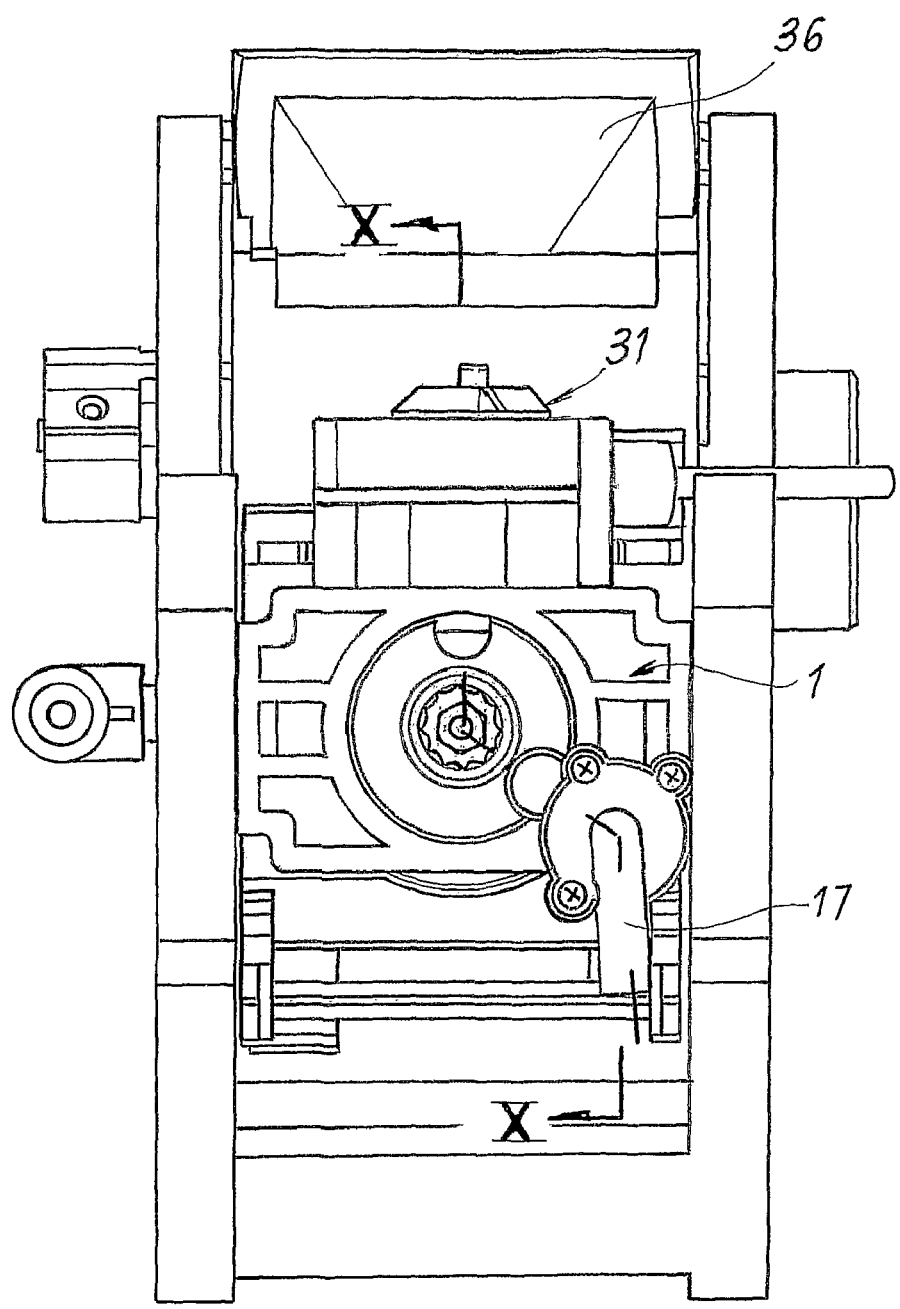
FIG. 7 is a plan view of an infusion unit for a device according to the invention in an improved embodiment of the device.
Figure 8:
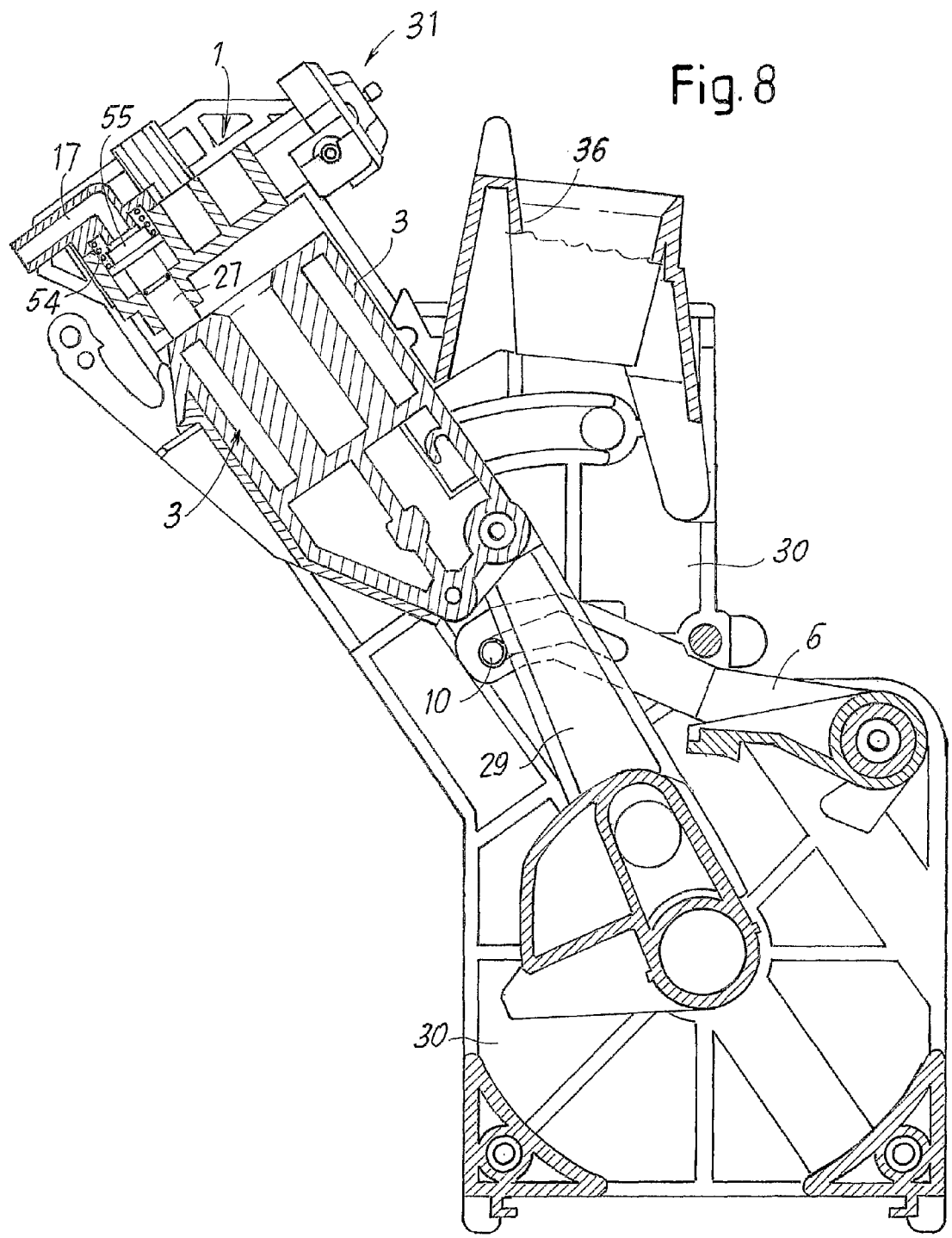
FIGS. 8 and 9 are sectional views according to the lines VIII-VIII and IX-IX in FIG. 7 in a first operating condition for dispensing espresso coffee.
Figure 9:
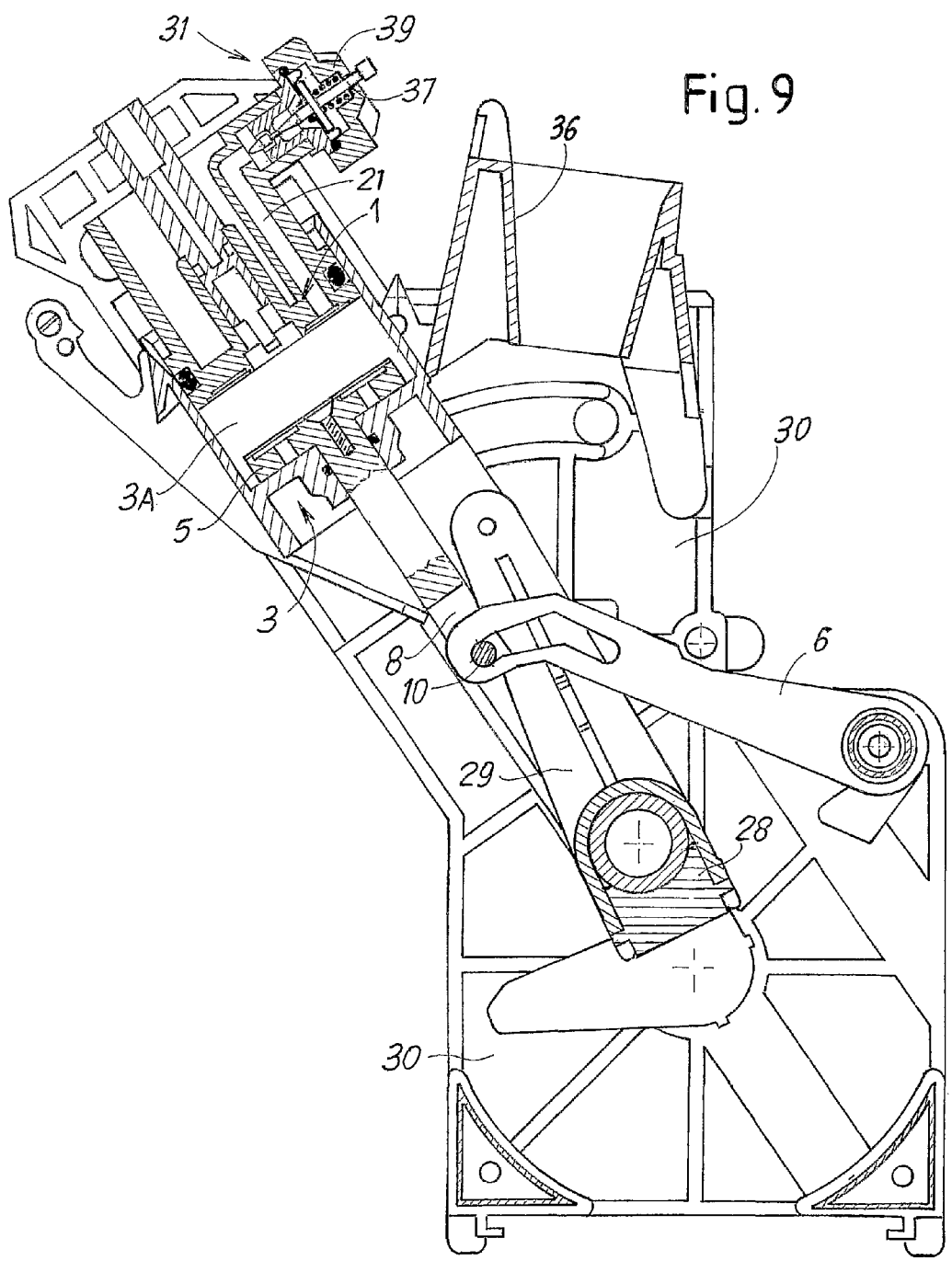

The diagram in FIG. 6 extremely schematically shows a characteristic curve C of the pump 13, the pressure values being indicated on the ordinate and the flow rate values in volume of water being indicated on the abscissa. Two points A and B are indicated on the characteristic curve C, corresponding to operation of the pump in the case of open passage 17 (FIG. 3) and in the case of closed passage 17 (FIG. 4). The flow rates in the two conditions are indicated with $H_A$ and $H_B$, while the respective pressures are indicated with $P_A$ and $P_B$. It is understood that the two operating points A and B of the pump are the direct consequence of the different pressure drop along the path of the liquid inside the device resulting from closing of the passage 17 and, to a lesser extent, of a different degree of compression of the coffee powder in the infusion chamber.

Therefore, simply by controlling movement of the movable part 3 of the infusion chamber and reaching one or other of the two positions shown in FIGS. 3 and 4, substantially different qualities of coffee can be obtained with the same dispensing unit without the need for any operation to regulate the pump. Consequently, this can be designed to operate optimally (i.e. with maximum efficiency) on a single characteristic curve, which will be the one used (curve C in FIG. 6) in all operating conditions of the unit. However, it would also be possible to add a pump control to the described configuration to modify the operating conditions thereof.

Figure 5:
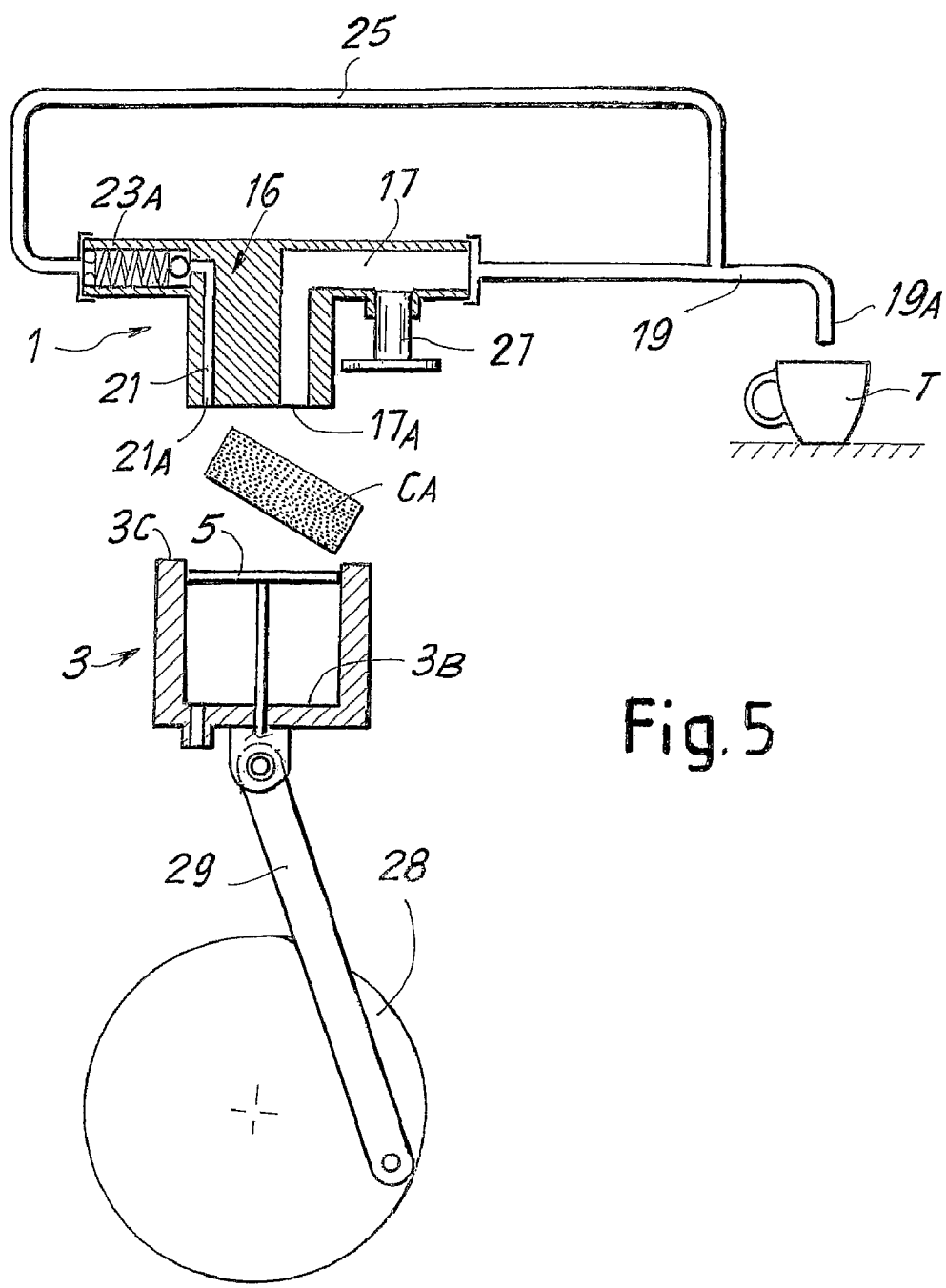

FIG. 5 shows the subsequent step to the one to dispense the coffee, in which the movable part 3 is returned downwards while the ejector 5 is operated to eject the used coffee powder from the infusion powder and position the dispensing unit for a new operating cycle.

Figure 15:
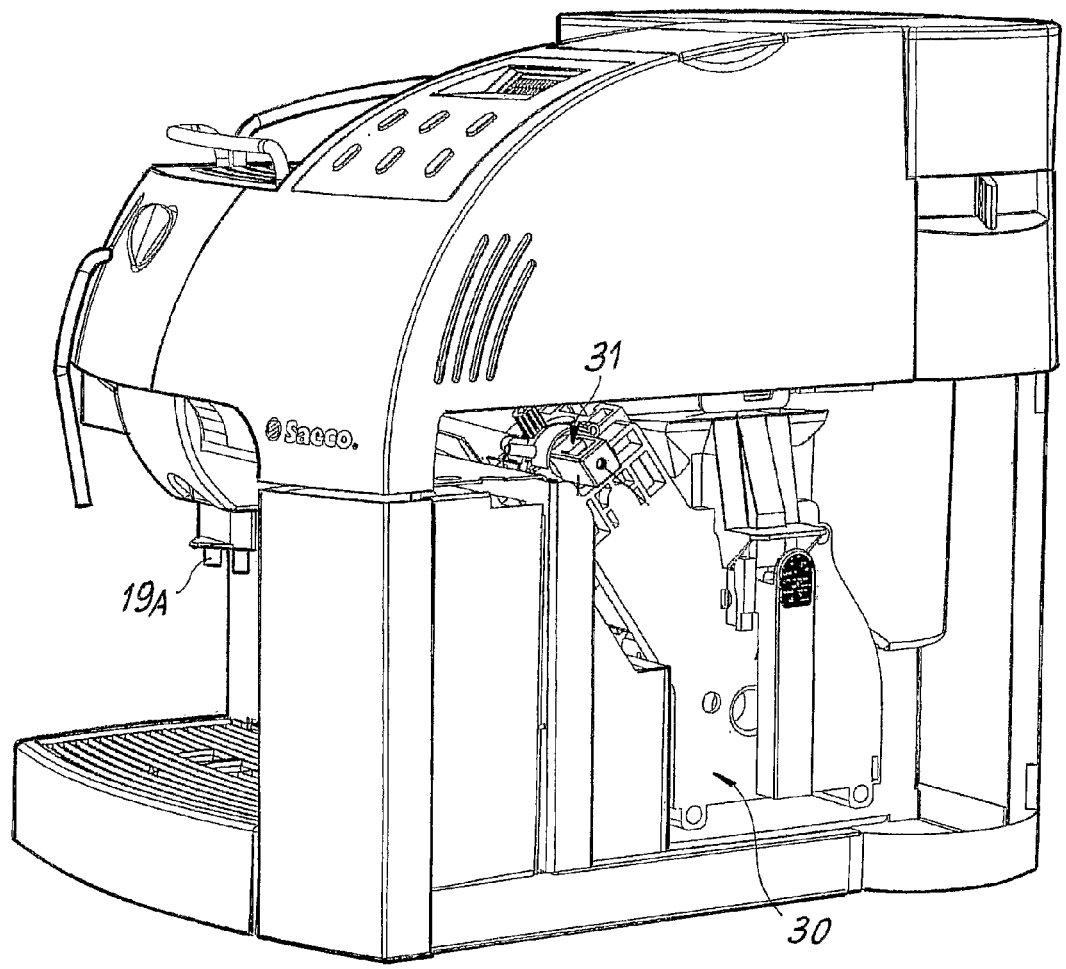
FIG. 15 is a perspective view of a coffee machine fitted with the infusion unit similar to the one in FIGS. 7 to 12.

FIGS. 7 to 12 show the practical application of the invention to a dispensing unit of the type currently utilized on numerous coffee machines produced by Saeco International Group s.p.a. and described, for example in EP-A-0.154.206. Parts equivalent to those illustrated in the schematic example of embodiment of the previous figures are indicated with the same reference numbers. These figures show the parts 1 and 3 (fixed and movable respectively) defining the infusion chamber, the inner volume of which is indicated with 3A. The disc for extraction or ejection of the used coffee powder is indicated with 5, which is controlled by a lever mechanism formed by a lever 6 swiveling about a fixed axis and hinged in 10 to a rod 8 constrained rigidly to the disc 5. A crank is indicated with 28, functionally equivalent to the eccentric 28 and connected to the connecting rod 29 to control movement of the movable part 3 with respect to the fixed part 1. A fixed supporting structure is indicated with 30, advantageously forming a single body removable from the machine, shown by way of example in FIG. 15.

Figure 10:
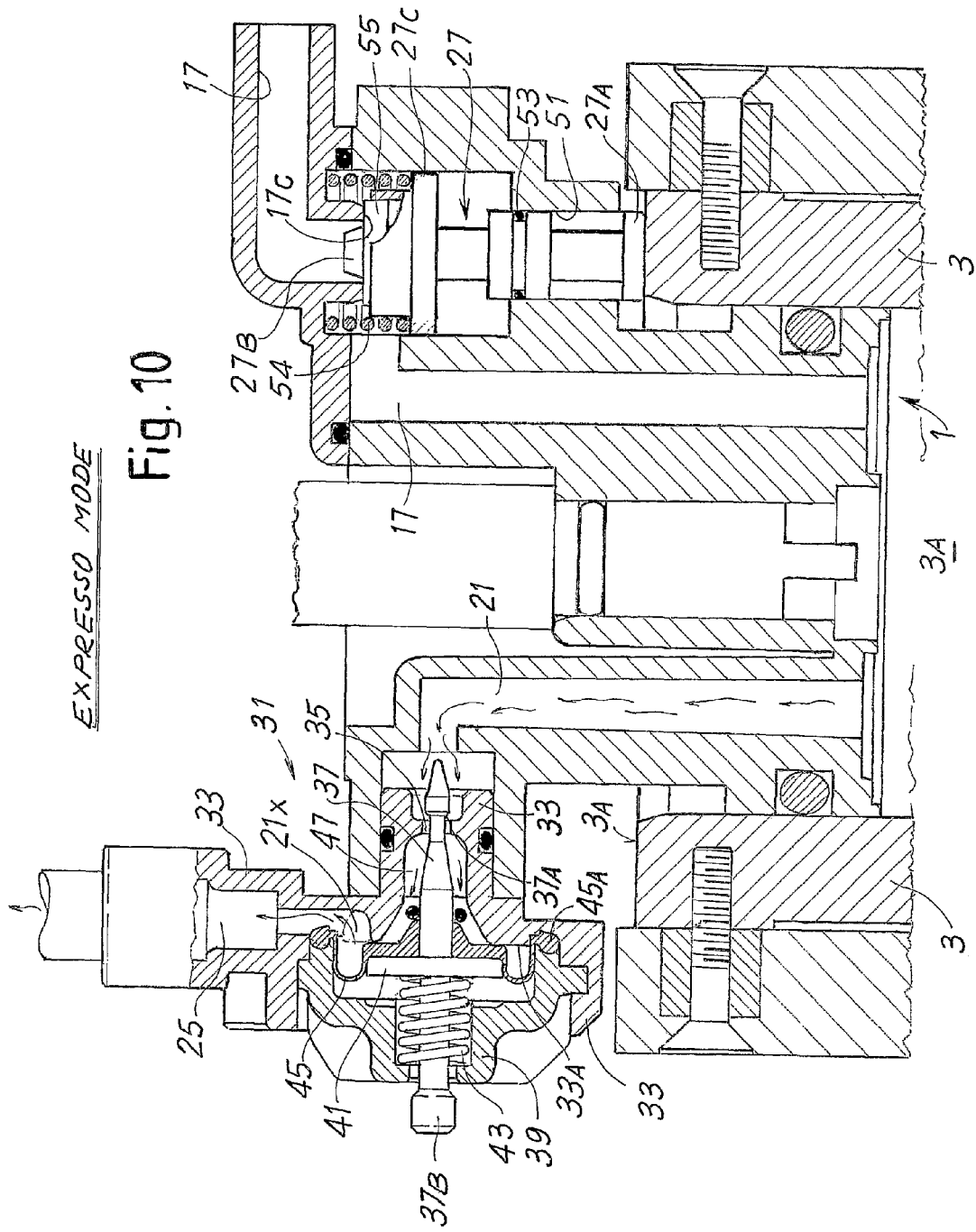
FIG. 10 is an enlarged detail sectional view according to the line X-X in FIG. 7 of the device in the configuration in FIGS. 8 and 9.
Figure 13:
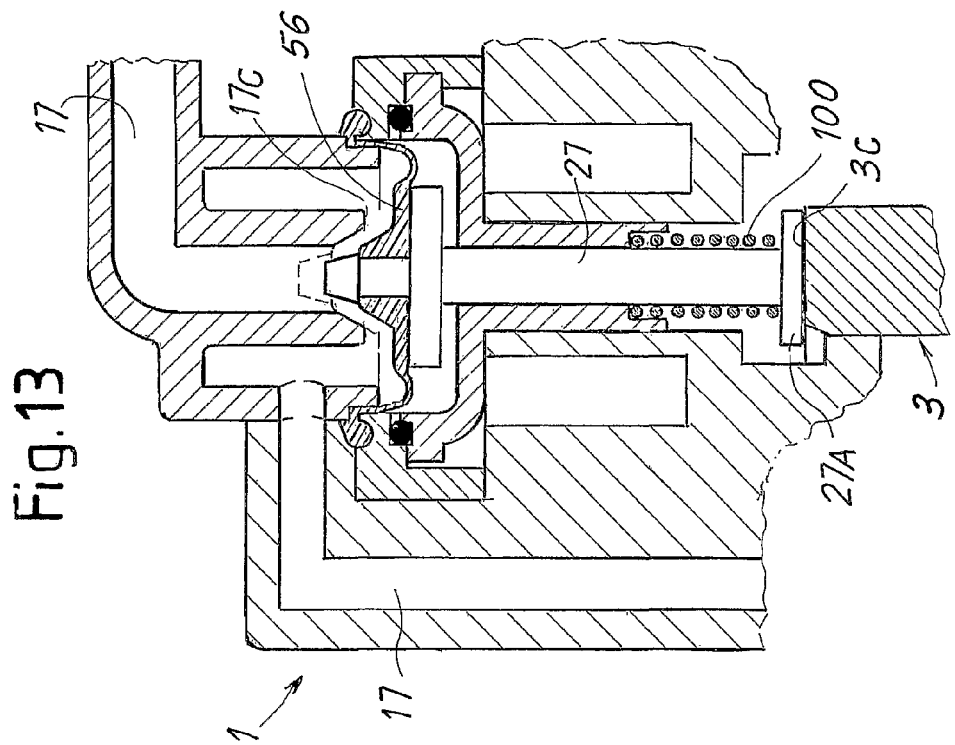
FIG. 13 is an enlarged sectional view of the dispensing duct or passage with the larger section in a modified embodiment and in a section analogous to the one in FIG. 10.

Configuration of the fixed part 1 with the passages or ducts 17 and 21 produced therein is shown in particular in the section in FIGS. 10 and 13. In this example of embodiment, the simple throttle 23 is replaced with a valve 31 to regulate the flow rate, of the type indicated in detail in EP-A-1.133.944 and in the equivalent U.S. Pat. No. 6,382,083, the content of which forms an integral part of the present description and which can be referred to for greater details.

The structure and operation of the valve 31 are described briefly hereunder. A valve body 33, in which a bore 35 is produced, is inserted in the duct or passage 21. Extending in the bore 35 is a needle-shaped plug 37, with a surface 37A cooperating with the edge of the calibrated bore 35 to close it. The plug 37 has a rod 37B which extends coaxially through a cap 39 coupled with a bayonet coupling or in another suitable way in a seat produced in the valve body 33. The rod 37B of the plug 37 has a disc 41, against which a helical compression spring 43 acts, held compressed between the disc 41 and the inside of the cap 39. In this way the plug 37 is held with the closing surface 37A thereof away from the edge of the bore 35. Held between the disc 41 and an annular supporting surface 33A of the valve body 33 is a disc-shaped membrane 45, the perimeter edge 45A of which is clamped between the body of the valve 33 and the cap 39. The compression force of the spring 43 holds the membrane against the annular surface 33A. Defined between the bore 35 and the surface of the membrane 45 facing the bore is a volume 47, which can be made to communicate with an outlet duct 21X, in substance forming a continuation of the duct 21, when the membrane 45 is raised from the supporting surface 33A against the force of the compression spring 43. The duct 21X connects with a coffee outlet line 25.

The valve 31 described briefly above behaves as a flow regulation valve. In fact, when the flow of coffee in the passage 21 is high and tends to exceed a set value, defined by calibration of the spring 43, the membrane 45 (which is partially raised from the seat 33A when there is adequate pressure of the coffee being delivered along the duct or passage 21) is further deformed against the force of the spring 43 causing throttling and finally closing of the bore 35 by the needle plug 37. This reduces or entirely interrupts the flow of coffee through the duct 21 in the volume 47 and therefore, as the coffee present in the latter is delivered towards the duct 21X, the membrane returns towards the supporting surface 33A through the action of the compression spring 43. Consequently, the bore 35 tends to open again. This results in efficacious regulation of the flow rate. By adjusting preload of the spring 43 this adjusts the flow rate, all as described in the aforesaid U.S. Pat. No. 6,382,083.

In the embodiment in FIGS. 7 to 12, the closing member 27 is designed as a rod sliding in a seat 51 produced in the fixed part 1 of the device, with an annular seal 53. The end of the rod (forming the closing member 27), indicated with 27A, cooperates with the movable part 3 of the infusion chamber, while the opposite end, indicated with 27B, has a gasket 55 which can act as a seal (when the closing member 27 is in the closed position) on a seat 17C. A disc 27C is integral with the rod, and forms the rod guide and the stop against which a helical spring 54 reacts to stress the rod in the open configuration.

Operation of the device in FIGS. 7 to 12 is as follows. When the infusion chamber is closed in the configuration in FIGS. 8, 9 and 10, the volume 3A of the infusion chamber has the minimum dimension. The upper edge 3C of the movable part 3 pushes the rod forming the closing member 27 into the closed position, with the gasket 55 pressed against the annular seat 17C. The duct or passage 17 is, therefore, perfectly closed. The pump, once operated, delivers pressurized water into the volume 3A, through the tablet of compressed coffee powder. The beverage, obtained by extracting the flavors and substances from the coffee powder by means of heated pressurized water, passes through the passage or duct 21 and, through the valve 31, reaches the duct 21X and then the duct 25 (which connects with the duct 17 downstream towards a dispensing spout, not shown, and identical to the spout 19).

The valve 31, suitably calibrated, regulates the flow rate of water and thus of coffee. The time the hot water remains in contact with the coffee powder is thus set to the desired value according to the strength of coffee to be obtained from the machine. In this configuration, the device dispenses espresso coffee. Although the example does not show members that can be utilized by the user to modify the flow rate, these can undoubtedly be produced, for example as described in U.S. Pat. No. 6,382,083.

Figure 11:
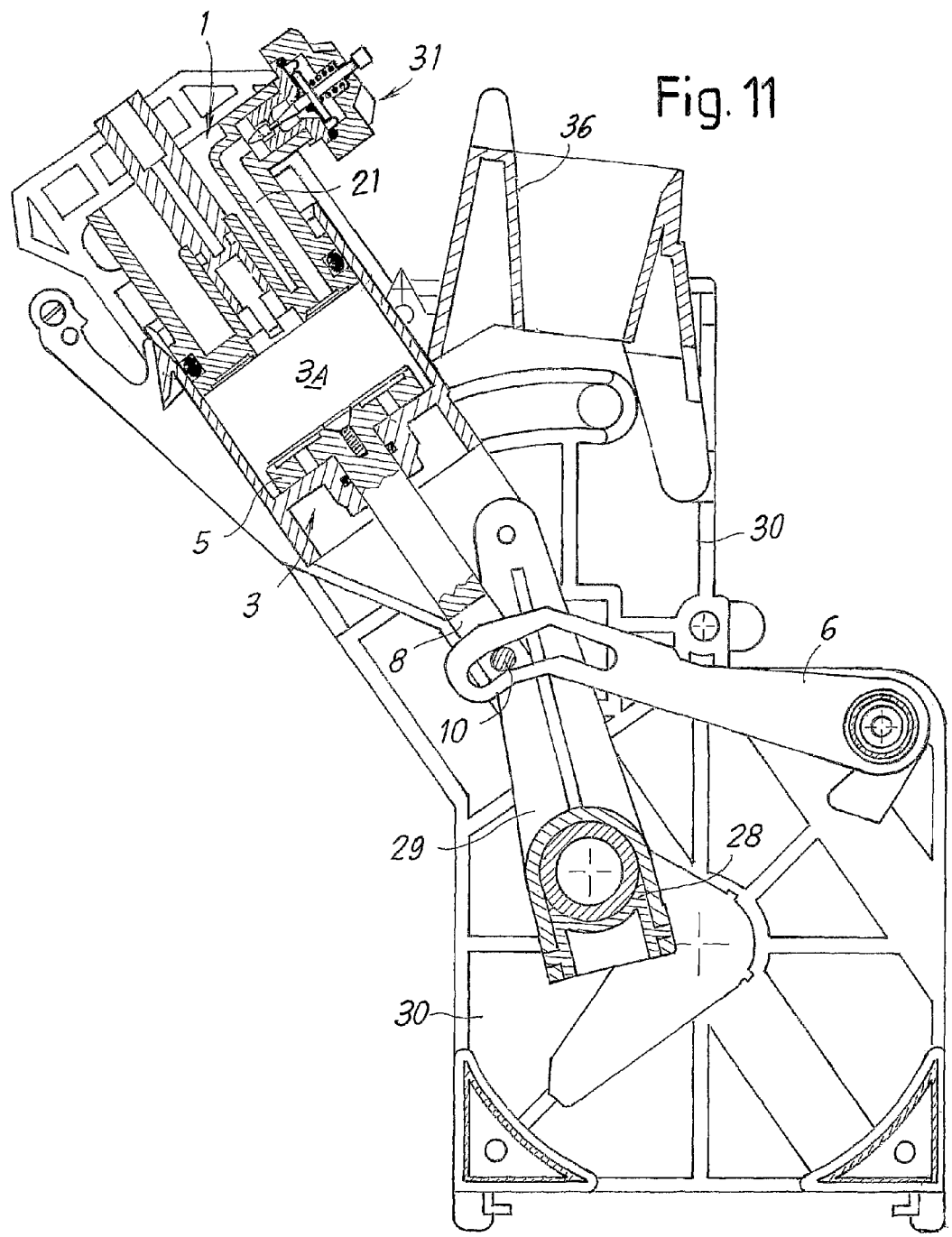
FIGS. 11 and 12 are sectional views equivalent to FIGS. 9 and 10 of the device in a configuration for dispensing filter or fresh brew coffee.
Figure 12:
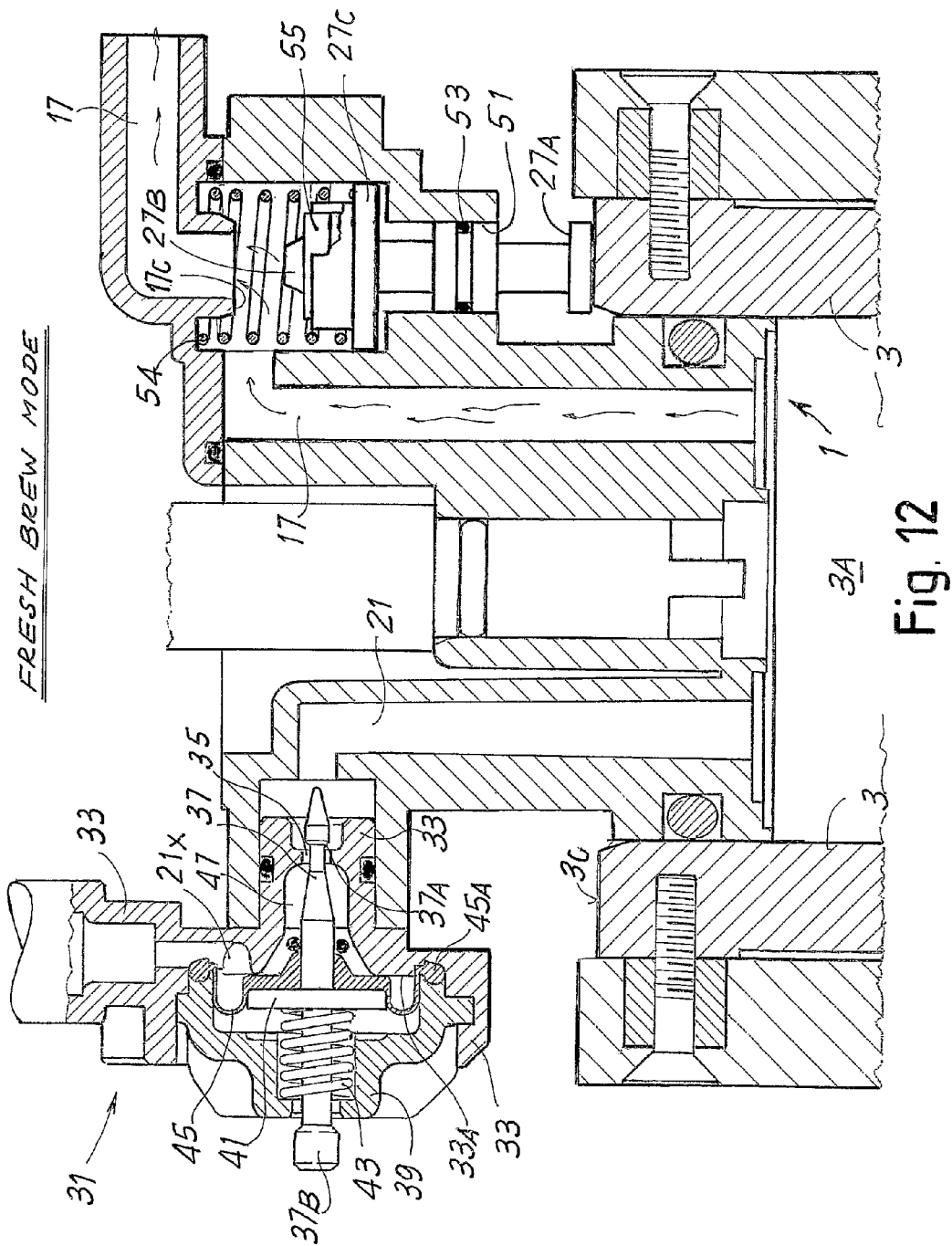

When the device is utilized to dispense filter or fresh brew coffee, it has the configuration in FIGS. 11 and 12. The closing member 27 is in the open condition and the volume 3A inside the infusion chamber is greater with respect to the configuration in FIGS. 8 to 10. The coffee obtained by infusion in the volume 3A is prevalently delivered through the duct or passage 17, where it finds less obstruction. No flow or a negligible flow, which is in any case recovered through the line or duct 25, passes through the duct 21.

FIG. 13 shows a variant of embodiment of the closing member 27, in which the gasket 27B is replaced by a membrane 56. A spring, indicated with 100, stresses the member 27 in the open position. In this case the spring is external with respect to the duct for passage of the coffee.

Figure 14:
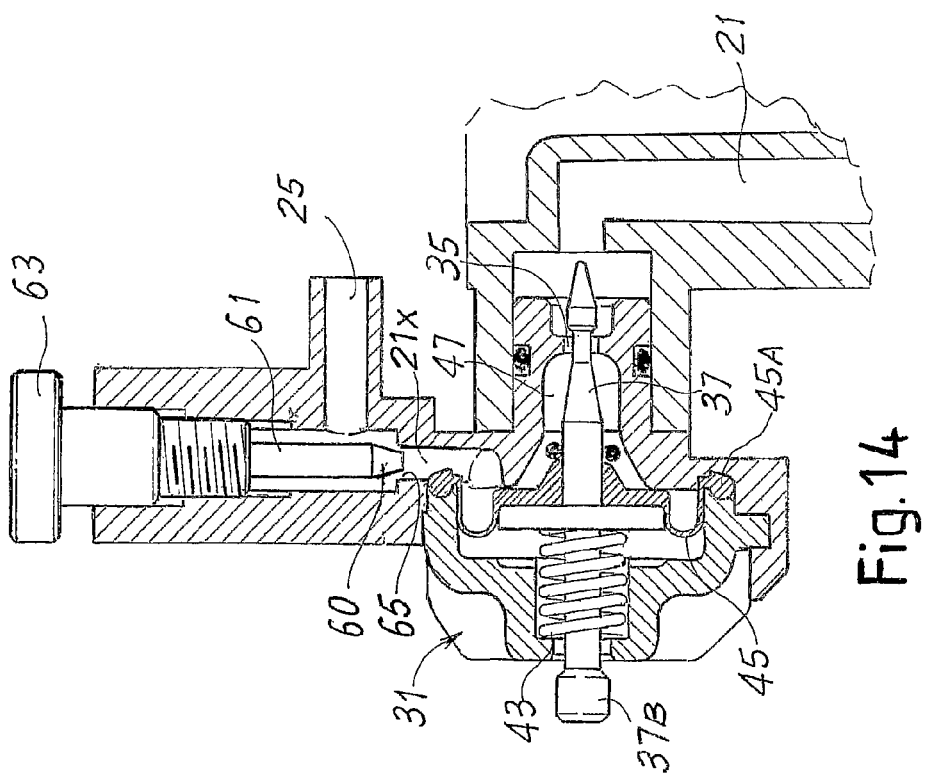
FIG. 14 is a sectional view of the detail of the passage with smaller section in a modified embodiment and with manual regulation of the quality of coffee.

FIG. 14 shows a variant of embodiment of the valve 31 to regulate the flow rate. With respect to the embodiment previously described, in this case, downstream of the membrane 45, a needle valve or throttle 61 is provided along the duct 21X, with a knob 63 which can be used to regulate the position of the throttle 61 with respect to a seat 65. This produces a throttle valve for regulation of the back pressure and consequently the infusion pressure. This regulation can be performed in the factory, during installation or during use by the user. In the last case, an actuator controlled by a control unit, interfaced with the user through a control keypad or the like, can advantageously be provided to act on the rod 61.

As mentioned above, the pump or pumps, which supply pressurized hot water to the infusion chamber, can be controlled so that they always operate at maximum power. In this case, depending on the mode to which the dispensing unit (comprising the passages 17, 21, the closing member 27, the throttle 23 and/or the flow regulation valve 31) is switched, the pump will operate in one or in the other operating point along the characteristic curve thereof.

Figure 16:
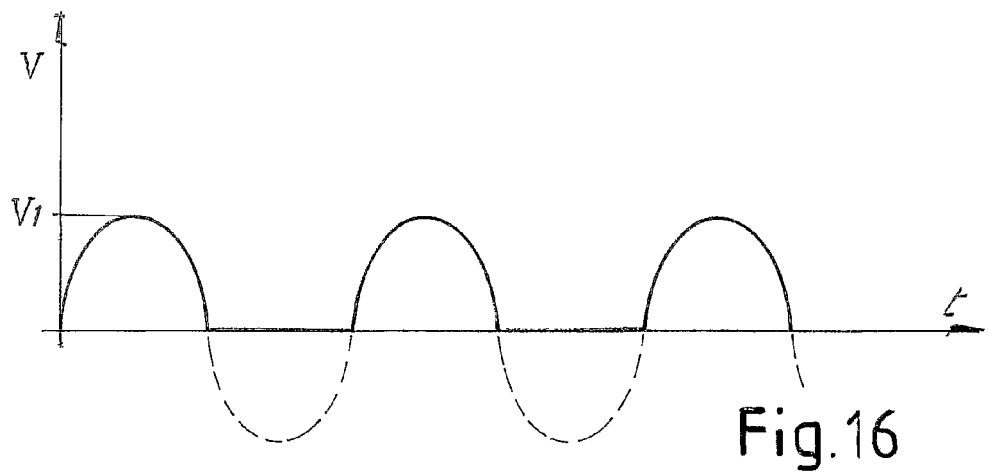
FIGS. 16 and 17 are diagrams of the waveform of the supply voltage of the pump in a configuration with pump which can be choked.
Figure 17:
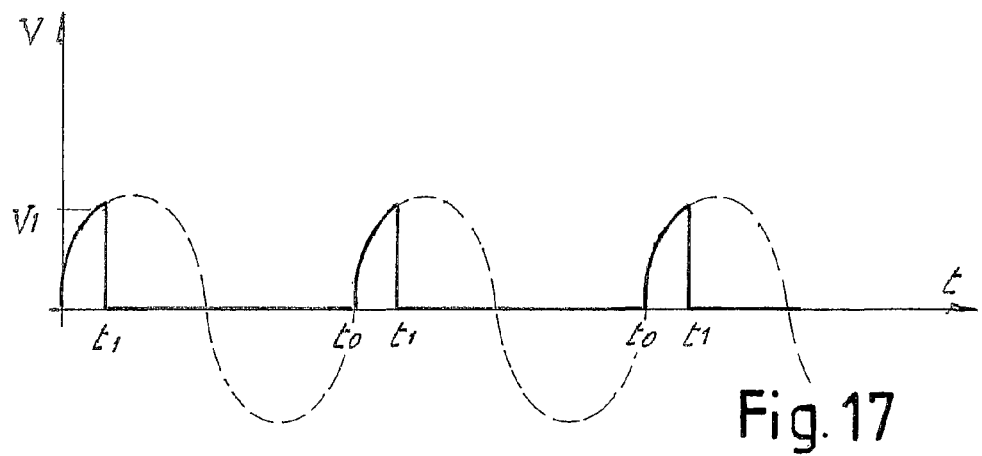

However, it would also be possible to adjust the operating speed of the pump or pumps, for example through the same control unit that manages the remaining parts of the machine, such as movement of the part 3 of the infusion chamber. If the pump used is a membrane pump, that is, a vibration pump controlled by an electromagnet, it can be choked, by making it operate intermittently. This can be obtained by cyclically interrupting the power supply to the electromagnetic actuator of the pump. Alternatively, the duty cycle of the pump can be reduced to obtain choking by acting on the waveform of the supply voltage. FIG. 16 shows the waveform of the supply voltage V. This is obtained by canceling the negative half-cycle of the network voltage using a diode. When the pump operates at full speed the entire waveform of the voltage is utilized. On the other hand, when, for example, the pump flow rate is to be reduced, the supply voltage is varied as shown in the diagram in FIG. 17. At each positive half-cycle the power supply is interrupted when the voltage reaches (at the instant t1) the value V1.

This regulation can be particularly useful when the device operates with the dispensing unit switched as in FIGS. 11 and 12, to produce fresh brew coffee. In this case, choking of the pump reduces the flow rate thereby making it possible to produce a richer coffee.

Irrespective of the configuration of the device described, it can be produced as a block removable from the coffee machine without the use of particular tools, to facilitate in this way any maintenance operations, repairs, cleaning or the like.

While specific embodiments of the invention have been shown and described in detail to illustrate the application of the principles of the invention, it will be understood that the invention may be embodied otherwise without departing from such principles.

The invention claimed is:

1. A device for producing coffee, the device comprising:
an infusion chamber defined by at least two parts movable in relation to each other to close and open the infusion chamber and to change an infusion volume;
a duct to supply pressurized hot water to said infusion chamber;
a pump to supply pressurized hot water to said infusion chamber;
a closing member; and
a dispensing unit having a first passage with a first cross section for dispensing coffee at a first pressure and a second passage with a second cross section smaller in size than the first cross section for dispensing coffee at a second pressure,
said at least two parts
acting on said dispensing unit to switch to either a first configuration or a second configuration, by moving said at least two parts to form either a first infusion volume or a second infusion volume different than the first infusion volume, with each given configuration suitable for dispensing a corresponding type of coffee from the infusion chamber, and
acting on said closing member to close said first passage in response to said at least two parts forming said second infusion volume.

2. The device as claimed in claim 1, wherein at least one of said at least two parts is arranged and designed to act mechanically on said dispensing unit such that said dispensing unit switches from said first configuration to said second configuration when said at least two parts are in said first reciprocal position.

3. The device as claimed in claim 2, wherein one of said at least two parts is fixed with respect to a supporting structure and another one of said at least two parts is movable, said movable part being designed and arranged to act mechanically on the dispensing unit, said dispensing unit switching from said first configuration to said second configuration based on a position of said movable part.

4. The device as claimed in claim 2, wherein said dispensing unit is integrally connected with a first of said two parts defining the infusion chamber.

5. The device as claimed in claim 1, wherein one of said at least two parts is fixed with respect to a supporting structure and another one of said at least two parts is movable, said movable part being designed and arranged to act mechanically on the dispensing unit, said dispensing unit switching from said first configuration to said second configuration based on a position of said movable part.

6. The device as claimed in claim 1, wherein said dispensing unit is integrally connected with one of said at least two parts.

7. The device as claimed in claim 6, wherein one of said at least two parts is a fixed part, said dispensing unit is integral with a fixed part, another one of said at least two parts being a movable part.

8. The device as claimed in claim 1, wherein said dispensing unit is integrally connected with a first of said at least two parts and a second of said at least two parts has an edge that engages said closing member.

9. The device as claimed in claim 1, wherein said pump is a vibration pump.

10. The device as claimed in claim 1, wherein said pump is controlled such that said pump always supplies a maximum pressure, in any closed or open condition of said first and second passage of the dispensing device.

11. The device as claimed in claim 1, wherein said pump is designed and controlled such that said pump operates the same characteristic curve, irrespective of the conditions to which said dispensing unit is switched.

12. The device as claimed in claim 1, wherein said pump is controlled such that said pump operates in different operating conditions according to the characteristics of coffee desired.

13. The device as claimed in claim 1, further comprising a second pump.

14. The device as claimed in claim 13, wherein said first pump has different characteristics than said second pump.

15. The device as claimed in claim 13, wherein said two pumps are controlled such that said pumps are activated alternatively or in combination based on whether said dispensing unit is in said first configuration or said second configuration.

16. The device as claimed in claim 1, the device for producing coffee can be removed without the use of tools.

17. A device for producing coffee, the device comprising:
an infusion chamber defined by at least two parts movable in relation to each other to close and open the infusion chamber;
a duct to supply pressurized hot water to said infusion chamber;
a pump to supply pressurized hot water to said infusion chamber;
a dispensing unit for dispensing coffee from the infusion chamber; said dispensing unit having at least a first configuration and a second configuration based on the type of coffee to be dispensed, said at least two parts moving from a first reciprocal position to a second reciprocal position, said infusion chamber having a first infusion volume when said at least two parts are in said first reciprocal position, said infusion chamber having a second infusion volume when said at least two parts are in said second reciprocal position, said second infusion volume being less than said first infusion volume, said at least two parts being functionally connected to said dispensing unit, said dispensing unit being switched to said first configuration or said second configuration when said at least two parts are in said first reciprocal position or said second reciprocal position, said dispensing unit including a first passage with a first cross section for dispensing coffee at a first pressure and a second passage with a second cross section for dispensing coffee at a second pressure, said second pressure being greater than said first pressure, said first cross section of said first passage having a size greater than a size of said second cross section of said second passage; and
a closing member associated with said first passage, said closing member being arranged and controlled such that said closing member closes said first passage when said at least two parts are in said second reciprocal position, wherein said closing member is controlled directly by one of said at least two parts defining the infusion chamber.

18. The device as claimed in claim 17, wherein at least one of said at least two parts is arranged and designed to act mechanically on said dispensing unit such that said dispensing unit switches from said first configuration to said second configuration when said at least two parts are in said first reciprocal position.

19. The device as claimed in claim 17, wherein one of said at least two parts is fixed with respect to a supporting structure and another one of said at least two parts is movable, said movable part being designed and arranged to act mechanically on the dispensing unit, said dispensing unit switching from said first configuration to said second configuration based on a position of said movable part.

20. The device as claimed in claim 17, wherein said dispensing unit is integrally connected with a first of said two parts defining the infusion chamber.

21. A device for producing coffee, the device comprising:
an infusion chamber defined by at least two parts movable in relation to each other to close and open the infusion chamber;
a duct to supply pressurized hot water to said infusion chamber;
a pump to supply pressurized hot water to said infusion chamber;
a dispensing unit for dispensing coffee from the infusion chamber; said dispensing unit having at least a first configuration and a second configuration based on the type of coffee to be dispensed, said at least two parts moving from a first reciprocal position to a second reciprocal position, said infusion chamber having a first infusion volume when said at least two parts are in said first reciprocal position, said infusion chamber having a second infusion volume when said at least two parts are in said second reciprocal position, said second infusion volume being less than said first infusion volume, said at least two parts being functionally connected to said dispensing unit, said dispensing unit being switched to said first configuration or said second configuration when said at least two parts are in said first reciprocal position or said second reciprocal position, said dispensing unit including a first passage with a first cross section for dispensing coffee at a first pressure and a second passage with a second cross section for dispensing coffee at a second pressure, said second pressure being greater than said first pressure, said first cross section of said first passage having a size greater than a size of said second cross section of said second passage; and
a closing member associated with said first passage, said closing member being arranged and controlled such that said closing member closes said first passage when said at least two parts are in said second reciprocal position, wherein a back pressure valve is associated with said second passage.

22. The device as claimed in claim 21, wherein said back pressure valve is adjustable, with manual or electric adjustment.

23. A device for producing coffee, the device comprising:
an infusion chamber defined by at least two parts movable in relation to each other to close and open the infusion chamber;
a duct to supply pressurized hot water to said infusion chamber;
a pump to supply pressurized hot water to said infusion chamber;
a dispensing unit for dispensing coffee from the infusion chamber; said dispensing unit having at least a first configuration and a second configuration based on the type of coffee to be dispensed, said at least two parts moving from a first reciprocal position to a second reciprocal position, said infusion chamber having a first infusion volume when said at least two parts are in said first reciprocal position, said infusion chamber having a second infusion volume when said at least two parts are in said second reciprocal position, said second infusion volume being less than said first infusion volume, said at least two parts being functionally connected to said dispensing unit, said dispensing unit being switched to said first configuration or said second configuration when said at least two parts are in said first reciprocal position or said second reciprocal position, said dispensing unit including a first passage with a first cross section for dispensing coffee at a first pressure and a second passage with a second cross section for dispensing coffee at a second pressure, said second pressure being greater than said first pressure, said first cross section of said first passage having a size greater than a size of said second cross section of said second passage; and
a closing member associated with said first passage, said closing member being arranged and controlled such that said closing member closes said first passage when said at least two parts are in said second reciprocal position, wherein a flow regulation valve is associated with at least said second passage of the dispensing unit.

24. The device as claimed in claim 23, wherein members are associated with said flow regulation valve for adjusting a flow rate through said second passage.

25. The device as claimed in claim 24, wherein said adjustment is performed by regulating preload of a spring associated with a plug of said second passage and/or regulating the second cross section of said second passage.

26. A device for producing coffee, the device comprising:
an infusion chamber defined by at least two parts movable in relation to each other to close and open the infusion chamber;
a duct to supply pressurized hot water to said infusion chamber;
a pump to supply pressurized hot water to said infusion chamber;
a dispensing unit for dispensing coffee from the infusion chamber; said dispensing unit having at least a first configuration and a second configuration based on the type of coffee to be dispensed, said at least two parts moving from a first reciprocal position to a second reciprocal position, said infusion chamber having a first infusion volume when said at least two parts are in said first reciprocal position, said infusion chamber having a second infusion volume when said at least two parts are in said second reciprocal position, said second infusion volume being less than said first infusion volume, said at least two parts being functionally connected to said dispensing unit, said dispensing unit being switched to said first configuration or said second configuration when said at least two parts are in said first reciprocal position or said second reciprocal position, said dispensing unit including a first passage with a first cross section for dispensing coffee at a first pressure and a second passage with a second cross section for dispensing coffee at a second pressure, said second pressure being greater than said first pressure, said first cross section of said first passage having a size greater than a size of said second cross section of said second passage; and a closing member associated with said first passage, said closing member being arranged and controlled such that said closing member closes said first passage when said at least two parts are in said second reciprocal position, wherein said closing member includes a rod stressed elastically in an open position, with one end cooperating with one of said at least two parts.

27. The device as claimed in claim 26, wherein said rod comprises a second end for closing said first passage.

28. The device as claimed in claim 26, wherein said rod cooperates with an elastic sealing membrane, to close said first passage.

29. A device for producing coffee, the device comprising:
an infusion chamber defined by at least two parts movable in relation to each other to close and open the infusion chamber;
a duct to supply pressurized hot water to said infusion chamber;
a pump to supply pressurized hot water to said infusion chamber;
a dispensing unit for dispensing coffee from the infusion chamber; said dispensing unit having at least a first configuration and a second configuration based on the type of coffee to be dispensed, said at least two parts moving from a first reciprocal position to a second reciprocal position, said infusion chamber having a first infusion volume when said at least two parts are in said first reciprocal position, said infusion chamber having a second infusion volume when said at least two parts are in said second reciprocal position, said second infusion volume being less than said first infusion volume, said at least two parts being functionally connected to said dispensing unit, said dispensing unit being switched to said first configuration or said second configuration when said at least two parts are in said first reciprocal position or said second reciprocal position, said dispensing unit including a first passage with a first cross section for dispensing coffee at a first pressure and a second passage with a second cross section for dispensing coffee at a second pressure, said second pressure being greater than said first pressure, said first cross section of said first passage having a size greater than a size of said second cross section of said second passage;
a closing member associated with said first passage, said closing member being arranged and controlled such that said closing member closes said first passage when said at least two parts are in said second reciprocal position; and
means to choke said pump according to the characteristics of coffee desired,
wherein said pump is controlled such that said pump operates in different operating conditions according to the characteristics of coffee desired.

30. The device as claimed in claim 29, wherein said pump is controlled with a variable duty-cycle.

31. The device as claimed in claim 29, wherein said pump is controlled such that said pump is regulated to deliver a higher or lower flow rate and/or pressure according to the characteristics of coffee desired when said dispensing unit is switched to produce coffee at a lower pressure.

32. A device for producing coffee, the device comprising:
an infusion chamber defined by at least two parts movable in relation to each other to close and open the infusion chamber;
a duct to supply pressurized hot water to said infusion chamber;
a pump to supply pressurized hot water to said infusion chamber;
a dispensing unit for dispensing coffee from the infusion chamber; said dispensing unit having at least a first configuration and a second configuration based on the type of coffee to be dispensed, said at least two parts moving from a first reciprocal position to a second reciprocal position, said infusion chamber having a first infusion volume when said at least two parts are in said first reciprocal position, said infusion chamber having a second infusion volume when said at least two parts are in said second reciprocal position, said second infusion volume being less than said first infusion volume, said at least two parts being functionally connected to said dispensing unit, said dispensing unit being switched to said first configuration or said second configuration when said at least two parts are in said first reciprocal position or said second reciprocal position, said dispensing unit including a first passage with a first cross section for dispensing coffee at a first pressure and a second passage with a second cross section for dispensing coffee at a second pressure, said second pressure being greater than said first pressure, said first cross section of said first passage having a size greater than a size of said second cross section of said second passage; and
a closing member associated with said first passage, said closing member being arranged and controlled such that said closing member closes said first passage when said at least two parts are in said second reciprocal position, wherein said infusion chamber has a configuration for receiving single-serving sachets of different dimensions, the dimension of the single-serving sachet determining a closing position of said at least two parts.

* * * * *